US012704840B2

(12) United States Patent
Ueno et al.

(10) Patent No.: US 12,704,840 B2
(45) Date of Patent: Aug. 11, 2026

(54) VEHICLE MOTION CONTROL APPARATUS, VEHICLE MOTION CONTROL METHOD, AND VEHICLE MOTION CONTROL SYSTEM

(71) Applicant: Hitachi Automotive Systems, Ltd., Hitachinaka (JP)

(72) Inventors: Kentaro Ueno, Atsugi (JP); Hiroshi Ito, Isehara (JP); Hiroki Sugawara, Sagamihara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 209 days.

(21) Appl. No.: 16/484,166

(22) PCT Filed: Jan. 24, 2018

(86) PCT No.: PCT/JP2018/002047
§ 371 (c)(1),
(2) Date: Aug. 7, 2019

(87) PCT Pub. No.: WO2018/150816
PCT Pub. Date: Aug. 23, 2018

(65) Prior Publication Data

US 2019/0361449 A1 Nov. 28, 2019

(30) Foreign Application Priority Data

Feb. 15, 2017 (JP) ................................ 2017-025564

(51) Int. Cl.
*G05D 1/00* (2024.01)
*B60W 60/00* (2020.01)

(52) U.S. Cl.
CPC ....... *G05D 1/0212* (2013.01); *B60W 60/0015* (2020.02)

(58) Field of Classification Search
CPC ... B60W 2050/009; B60W 2050/0091; B60W 2050/0094; B60W 2520/06;
(Continued)

(56) References Cited

U.S. PATENT DOCUMENTS 5,229,941 A * 7/1993 Hattori ................ G05D 1/0217 701/28
6,697,724 B2 * 2/2004 Beck ................... A01B 79/005 701/41
(Continued)

FOREIGN PATENT DOCUMENTS

JP 2003-162799 A 6/2003
JP 2005-173736 A 6/2005
(Continued)

OTHER PUBLICATIONS

International Search Report (PCT/ISA/210) issued in PCT Application No. PCT/JP2018/002047 dated Mar. 6, 2018 with English translation (10 pages).
(Continued)

*Primary Examiner* — Matthew J. Reda
(74) *Attorney, Agent, or Firm* — Crowell & Moring LLP

(57) ABSTRACT

The present invention is to provide a vehicle motion control apparatus, a vehicle motion control method, and a vehicle motion control system capable of preventing or cutting down a reduction in followability to a target trajectory. The vehicle motion control apparatus includes a target position accumulation portion configured to receive an input of a target position on a target trajectory of a vehicle on which the vehicle motion control apparatus is mounted and accumulate the target position, and an actuator instruction portion configured to output an instruction for causing the
(Continued)

vehicle to follow previous target positions accumulated by the target position accumulation portion to an actuator of the vehicle.

18 Claims, 5 Drawing Sheets

(58) Field of Classification Search
CPC ....... B60W 2520/10; B60W 2520/125; B60W 2520/14; B60W 2520/28; B60W 2710/20; B60W 50/0098; B60W 50/029; G08G 1/166; G05D 1/0088; G05D 1/0212; G05D 2201/0213
See application file for complete search history.

(56) References Cited

U.S. PATENT DOCUMENTS 7,009,558 B1* 3/2006 Fall .......................... H01Q 3/08 342/359
2005/0125115 A1 6/2005 Hiwatashi et al.
2008/0027591 A1* 1/2008 Lenser ................. G05D 1/0038 701/28
2008/0147247 A1* 6/2008 Weldin ............. B60W 50/0205 701/1
2008/0275602 A1 11/2008 Peake
2009/0099717 A1* 4/2009 Yabushita ............... B60T 8/172 701/25
2010/0097456 A1* 4/2010 Zhang ................. G06V 20/588 348/119
2010/0253918 A1* 10/2010 Seder ..................... G08G 1/167 353/13
2011/0307175 A1* 12/2011 Gandhi .................. G08G 1/166 701/301
2012/0053755 A1* 3/2012 Takagi .................. G01S 7/4808 701/1
2012/0277957 A1* 11/2012 Inoue .................... B60W 30/12 701/41
2012/0283907 A1* 11/2012 Lee ..................... B60T 8/17557 701/31.9
2013/0030606 A1* 1/2013 Mudalige ............. G05D 1/0293 701/2
2014/0037138 A1* 2/2014 Sato ....................... G06V 20/58 382/103
2014/0297063 A1* 10/2014 Shida ..................... G08G 1/166 701/1
2015/0367881 A1* 12/2015 Tsunoda ................ G01L 25/003 701/43
2016/0070265 A1* 3/2016 Liu ........................ G05D 1/652 701/25
2016/0313133 A1* 10/2016 Zeng .................. B60W 60/0011
2017/0066444 A1* 3/2017 Habu ..................... G08G 1/166
2017/0233004 A1* 8/2017 Hatano .................. B62D 6/002 701/41
2017/0293303 A1* 10/2017 Medagoda ........... B62D 15/029
2017/0355366 A1* 12/2017 Prasad ................. G05D 1/0246
2018/0099667 A1* 4/2018 Abe .................. B60W 30/0956
2018/0348776 A1* 12/2018 Inou ...................... B60W 10/18
2019/0025853 A1* 1/2019 Julian .................. G05D 1/0274
2019/0204850 A1* 7/2019 Panzica ................ G05D 1/0274
2019/0258259 A1* 8/2019 Yanagihara ........... B60W 30/09
2019/0285422 A1* 9/2019 Opitsch .............. G01C 21/3852
2020/0047769 A1* 2/2020 Oguro ............... B60W 60/0051
2020/0166352 A1* 5/2020 An .................. B60W 30/18154

FOREIGN PATENT DOCUMENTS

JP 2009-020549 A 1/2009
JP 2013-111985 A 6/2013
JP 2016-074317 A 5/2016
JP 2016-084093 A 5/2016
JP 2016-107658 A 6/2016
JP 2016-207064 A 12/2016

OTHER PUBLICATIONS

Japanese-language Written Opinion (PCT/ISA/237) issued in PCT Application No. PCT/JP2018/002047 dated Mar. 6, 2018 with English translation (15 pages).
Extended European Search Report issued in counterpart European Application No. 18754358.2 dated Dec. 4, 2019 (10 pages).

* cited by examiner

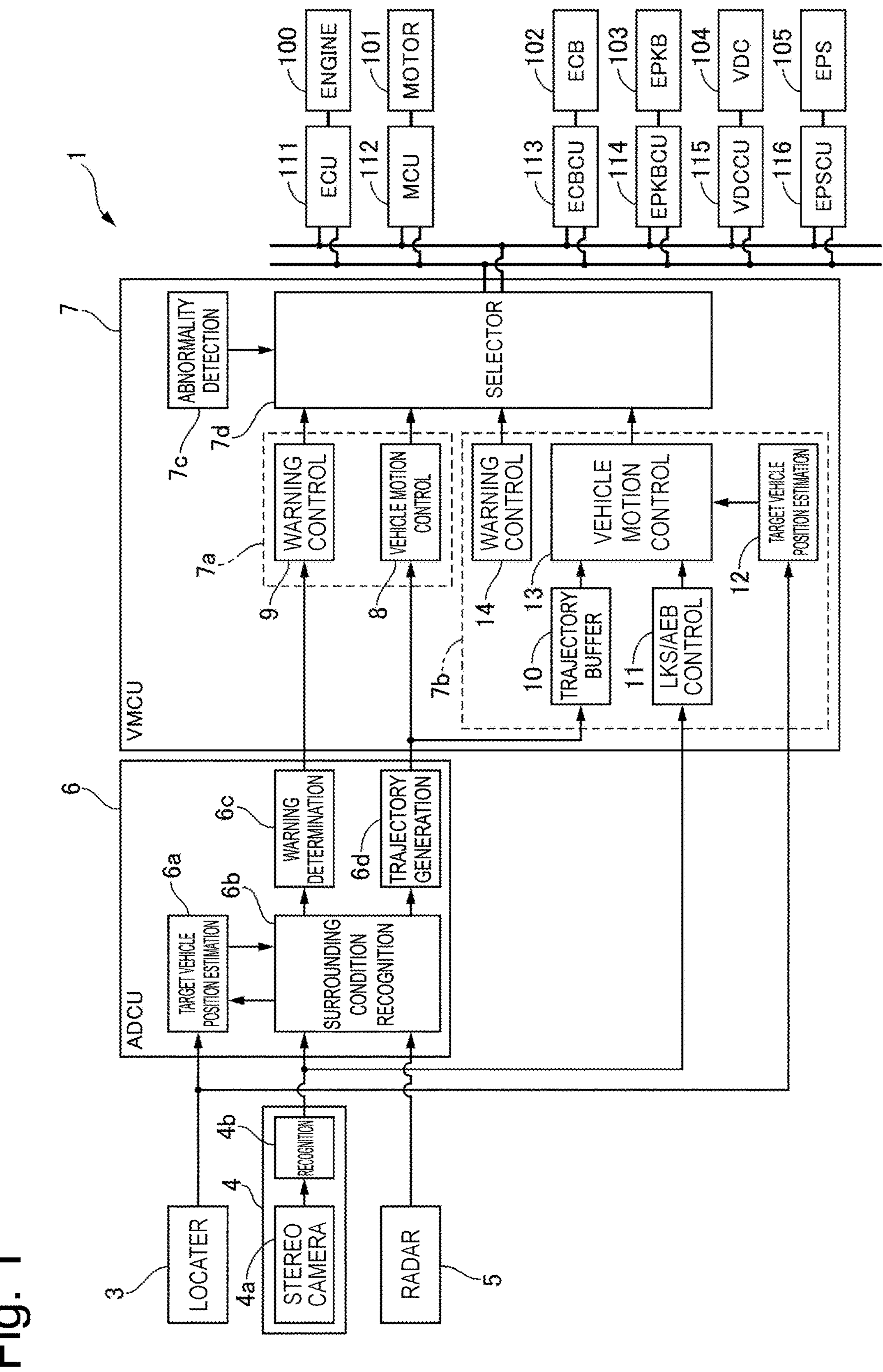

Fig. 1
1
LOCATER
3
STEREO CAMERA
4a
4
RECOGNITION
4b
RADAR
5
ADCU
6
TARGET VEHICLE POSITION ESTIMATION
6a
SURROUNDING CONDITION RECOGNITION
6b
WARNING DETERMINATION
6c
TRAJECTORY GENERATION
6d
VMCU
7
ABNORMALITY DETECTION
7c
SELECTOR
7d
7a
WARNING CONTROL
9
VEHICLE MOTION CONTROL
8
7b
WARNING CONTROL
14
VEHICLE MOTION CONTROL
13
TARGET VEHICLE POSITION ESTIMATION
12
TRAJECTORY BUFFER
10
LKS/AEB CONTROL
11
ECU
111
ENGINE
100
MCU
112
MOTOR
101
ECBCU
113
ECB
102
EPKBCU
114
EPKB
103
VDCCU
115
VDC
104
EPSCU
116
EPS
105

Fig. 4

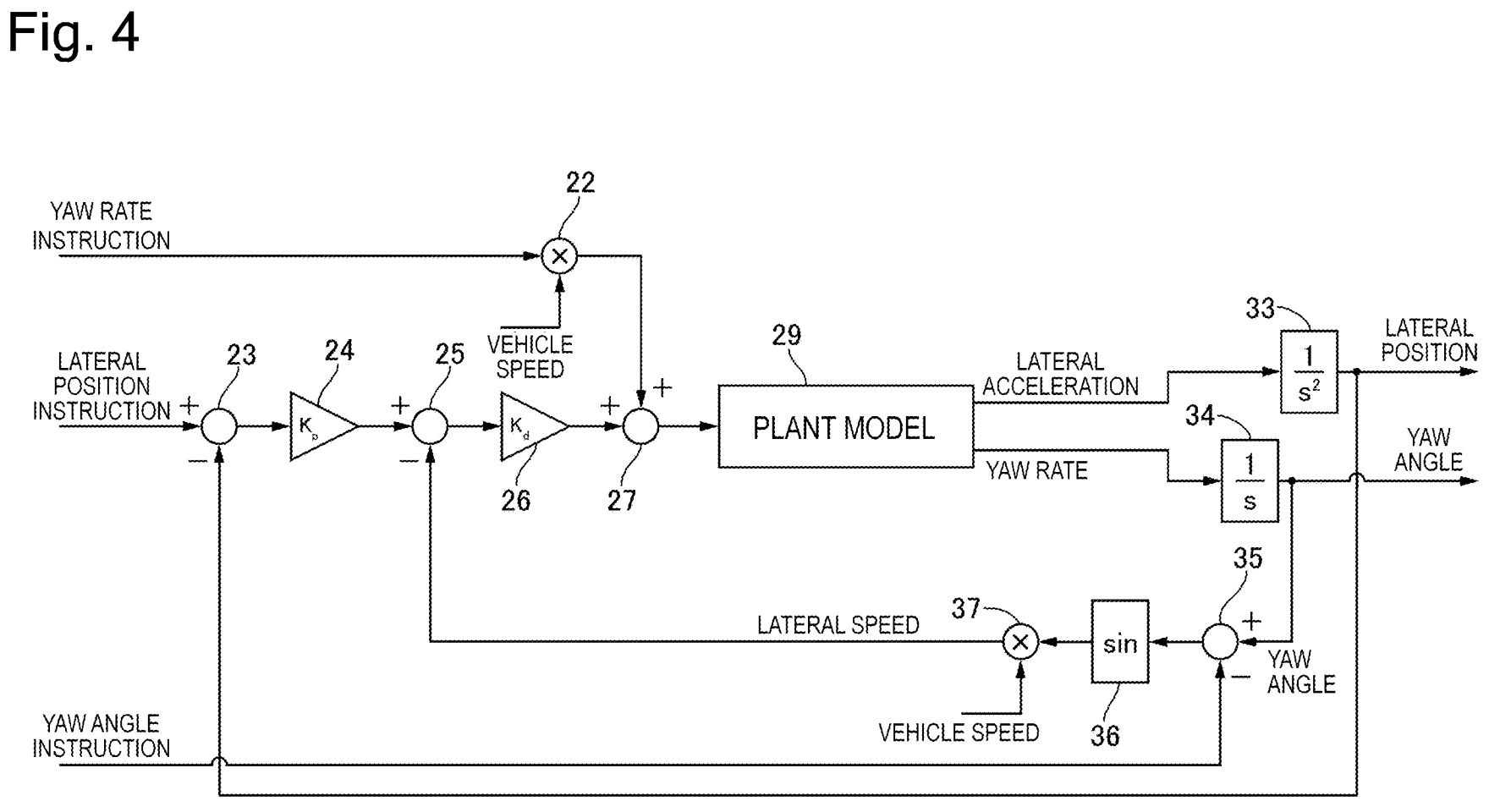

YAW RATE INSTRUCTION
LATERAL POSITION INSTRUCTION
YAW ANGLE INSTRUCTION
VEHICLE SPEED
22
23
24
25
26
27
29
PLANT MODEL
LATERAL ACCELERATION
YAW RATE
33
34
35
36
37
sin
LATERAL SPEED
VEHICLE SPEED
YAW ANGLE
LATERAL POSITION
YAW ANGLE

VEHICLE MOTION CONTROL APPARATUS, VEHICLE MOTION CONTROL METHOD, AND VEHICLE MOTION CONTROL SYSTEM

TECHNICAL FIELD

The present invention relates to a vehicle motion control apparatus, a vehicle motion control method, and a vehicle motion control system.

BACKGROUND ART

Conventionally, there has been known a vehicle motion control apparatus configured to autonomously drive a target vehicle in such a manner that the target vehicle runs along a target trajectory. PTL 1 discloses a technique that controls driving of an actuator of the target vehicle based on a preview model, which determines steering according to a difference between a position that the target vehicle will reach after a preview time and a target position.

CITATION LIST

Patent Literature

[PTL 1] Japanese Patent Application Public Disclosure No. 2016-107658

SUMMARY OF INVENTION

Technical Problem

However, the above-described conventional technique has such a problem that the target position is located far away from the target vehicle, which likely causes a running trajectory to become a shortcut trajectory with respect to the target trajectory when the vehicle runs a curve, thereby leading to a reduction in followability to the target trajectory.

One of objects of the present invention is to provide a vehicle motion control apparatus, a vehicle motion control method, and a vehicle motion control system capable of preventing or cutting down the reduction in the followability to the target trajectory.

Solution to Problem

A vehicle motion control apparatus according to one aspect of the present invention includes a target position accumulation portion configured to receive an input of a target position on a target trajectory of a vehicle on which the vehicle motion control apparatus is mounted and accumulate the target position, and an actuator instruction portion configured to output an instruction for causing the vehicle to follow previous target positions accumulated by the target position accumulation portion to an actuator of the vehicle.

Therefore, the reduction in the followability to the target trajectory can be prevented or cut down.

BRIEF DESCRIPTION OF DRAWINGS

FIG. 1 illustrates a configuration of a vehicle motion control system 1 according to a first embodiment.

FIG. 4 is a control block diagram of an actuator instruction portion 21 according to the first embodiment.

DESCRIPTION OF EMBODIMENTS

First Embodiment

Figure 2:
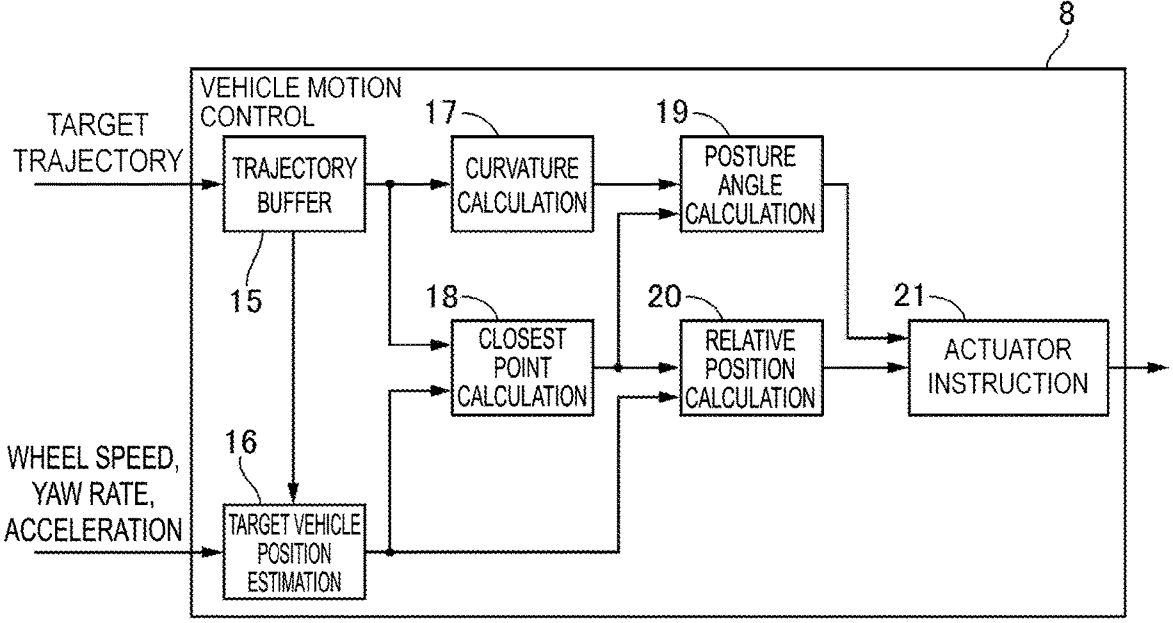
FIG. 2 illustrates a configuration of a vehicle motion control portion 8 according to the first embodiment.

FIG. 1 illustrates a configuration of a vehicle motion control system 1 according to a first embodiment.

The vehicle motion control system 1 is mounted on a hybrid vehicle using an engine 100 and a motor generation 101 as a driving source thereof. The vehicle motion control system 1 includes a locater 3, a camera unit 4, a radar 5, an autonomous driving control unit (hereinafter referred to as an ADCU) 6, and a vehicle motion control unit (a vehicle motion control apparatus, hereinafter referred to as a VMCU) 7.

The locater 3 includes a GNSS (Global Navigation Satellite System) receiver and an inertial sensor such as a gyroscope sensor. The locater 3 measures a position of a target vehicle (the vehicle on which the vehicle motion control system 1 is mounted) based on signals from a plurality of artificial satellites that are received by the GNSS receiver and a result of measurement by the inertial sensor. The position of the target vehicle is defined to be a center of gravity of the vehicle, a geometric central point, or a center of a rear axle.

The camera unit 4 includes a stereo camera 4*a* and a recognition portion 4*b*. The stereo camera 4*a* images a predetermined range in front of the target vehicle with use of two CCDs. The recognition portion 4*b* calculates a difference between images captured by the stereo camera 4*a* to recognize an object (an obstacle) based on a baseline length, and calculates a distance to the object.

The radar 5 emits, for example, a millimeter wave from a transmission antenna forward from the target vehicle. The radar 5 receives the millimeter wave reflected from the object with use of a reception antenna, and calculates the distance to the object.

The ADCU 6 includes a vehicle position estimation portion 6*a*, a surrounding condition recognition portion 6*b*, a warning determination portion 6*c*, and a trajectory generation portion 6*d*.

The vehicle position estimation portion 6*a* includes a memory that stores map data therein. The vehicle position estimation portion 6*a* estimates a position of the target vehicle from matching of the position of the target vehicle measured by the locater 3 with a dynamic map. At this time, the vehicle position estimation portion 6*a* achieves improvement of estimation accuracy by referring to a condition surrounding the target vehicle that is recognized by the surrounding condition recognition portion 6*b*.

The surrounding condition recognition portion 6*b* recognizes the condition surrounding the target vehicle based on the position of the target vehicle estimated by the vehicle position estimation portion 6*a* and the distance to the object calculated by the camera unit 4 and the radar 5. Examples of the condition surrounding the target vehicle include a curvature (a curvature radius) of a curve, a rotational angle, road information such as a start position, a moving object (a pedestrian, a bicycle, a motorcycle, another vehicle, and the like), and a stationary object (a dropped object on a road, a traffic light, a guardrail, a curb, a road sign, a road surface marking, a lane marking, a tree, and the like).

The warning determination portion 6*c* determines whether a warning to a driver is necessary based on presence or absence of a possibility of a collision, a contact, and a departure from a traffic lane that is determined from the condition surrounding the target vehicle recognized by the surrounding condition recognition portion 6*b*.

The trajectory generation portion 6*d* generates a target trajectory of the target vehicle for a driving assist function regarding autonomous driving. Examples of the autonomous assist function include a cruise control function (hereinafter referred to as an ACC), a traffic lane keeping assist function (hereinafter referred to as an LKS), an autonomous driving function (hereinafter referred to as an AD), an autonomous emergency brake function (hereinafter referred to as an AEB), and an emergency steering avoidance assist function. Among them, the ACC and the LKS can be switched to be activated/deactivated according to a driver's switch operation or the like. The target trajectory is a trajectory point (a target position) of the target vehicle after a preview time (a preview distance/vehicle speed). The trajectory generation portion 6*d* generates a yaw angle and a vehicle speed that the target vehicle attempts to achieve at the generated trajectory point. The trajectory generation portion 6*d* generates the trajectory point, the yaw angle, and the vehicle speed (hereinafter also referred to as the trajectory point and the like) at predetermined time intervals, and outputs them to the VMCU 7. The yaw angle of the target vehicle is an angle formed between a longitudinal axis direction of the target vehicle and a reference axis direction fixed on a road surface (for example, an x-axis direction in a coordinate system fixed on the road surface). The yaw angle output from the trajectory generation portion 6*d* to the VMCU 7 may be an angle formed between the longitudinal axis direction of the target vehicle and a tangential direction of the trajectory on the trajectory point. The trajectory point and the vehicle speed for each of the driving assist functions are generated with use of a known method. For example, in the LKS, the trajectory point is set at a center of a road on which the vehicle is running, and a setting vehicle speed set by the driver is used as the vehicle speed at the trajectory point. Further, in the ACC, when there is a preceding vehicle running ahead, the trajectory point is set on the preceding vehicle, and a vehicle speed that allows a predetermined distance to be maintained between the vehicles with respect to the preceding vehicle is used as the vehicle speed at the trajectory point. In the ACC, when there is no preceding vehicle, the trajectory point and the vehicle speed are set in a similar manner to the LKS. In the AD, the trajectory point is set on a set target route, and the vehicle speed at the trajectory point is set to a speed limit set on the road on which the vehicle is running or a target vehicle speed determined to be appropriate for the autonomous driving. Further, the yaw angle for each of the driving support functions is set to an angle at which the longitudinal axis direction of the target vehicle matches the tangential direction of the target trajectory.

When a plurality of driving assist functions is in operation, the trajectory generation portion 6*d* selects and outputs, for example, a trajectory point for the most urgent driving assist function among respective trajectory points of them. For example, when the emergency steering avoidance assist function is started up or the traffic lane should be changed while the LKS is in operation, the trajectory point and the like for the emergency steering avoidance assist function or the change in the traffic lane are selected.

When the target trajectory is changed according to the emergency avoidance or the change in the traffic lane, the trajectory generation portion 6*d* outputs the trajectory point and the like successively in order from, for example, a trajectory point closest to the position of the target vehicle to, for example, a trajectory point located at the preview distance. A plurality of trajectory points and the like may be transmitted simultaneously depending on a communication capacity. At this time, the ADCU 6 shortens an interval at which the trajectory point and the like are transmitted or extends a distance between the trajectory points according to the vehicle speed or the like of the target vehicle so as to output the next trajectory point before the target vehicle reaches the trajectory point closest to the target vehicle among the trajectory points after the change. This shortening of the transmission time or extension of the distance between the points is carried out since the target trajectory is changed until the trajectory point and the like at the preview distance are transmitted.

The VMCU 7 includes a normal control portion 7*a*, a safe state control portion 7*b*, an abnormality detection portion 7*c*, and a selector 7*d*.

The normal control portion 7*a* includes a vehicle motion control portion 8 and a warning control portion 9.

The vehicle motion control portion 8 outputs an instruction (a steering instruction, and/or an acceleration or deceleration instruction) for causing the target vehicle to follow the trajectory point and the like output from the trajectory generation portion 6*d* to the selector 7*d*. Details of the vehicle motion control portion 8 will be described below.

The warning control portion 9 warns the driver by issuing a warning sound or a voice from a speaker when the warning determination portion 6*c* determines that the warning to the driver is necessary.

When the VMCU 7 cannot receive the trajectory point and the like due to, for example, an abnormality in the ADCU 6, the safe state control portion 7*b* generates the trajectory point and the like instead of the ADCU 6 during a predetermined time, and also outputs the instruction for causing the target vehicle to follow the trajectory point and the like to the selector 7*d* instead of the normal control portion 7*a*. The safe state control portion 7*b* includes a trajectory buffer portion 10, an LKS/AEB control portion 11, a vehicle position estimation portion 12, a vehicle motion control portion (a fail-safe actuator instruction portion) 13, and a warning control portion 14.

The trajectory buffer portion 10 accumulates the trajectory point and the like output from the trajectory generation portion 6*d*.

The LKS/AEB control portion 11 generates the trajectory point and the like for the LKS and the AEB based on the object and the distance to the object that are recognized by the camera unit 4 with use of a known method similarly to the trajectory generation portion 6*d*.

The vehicle position estimation portion 12 includes a memory that stores map data therein. The vehicle position estimation portion 12 estimates the position of the target vehicle from the matching with the dynamic map based on the position of the target vehicle measured by the locater 3.

When the VMCU 7 cannot receive the trajectory point and the like, the vehicle motion control portion 13 outputs an instruction (an acceleration instruction, a deceleration instruction, and/or a steering instruction) for causing the target vehicle to follow the trajectory point and the like for the LKS and the AEB that are generated by the LKS/AEB control portion 11 to the selector 7*d* (fail-safe actuator instruction output). When the trajectory point and the like generated by the LKS/AEB control portion 11 are determined to be unable to allow the vehicle to maintain safe running, the vehicle motion control portion 13 outputs an instruction for causing the target vehicle to follow the trajectory point and the like accumulated in the trajectory buffer portion 10 for a predetermined time to the selector 7*d*.

When the VMCU 7 cannot receive the trajectory point and the like, the warning control portion 14 warns the driver about an abnormality in the driving support function by issuing a warning sound or a voice from the speaker.

The abnormality detection portion 7*c* detects an abnormality in each of actuators that will be described below.

The selector 7*d* selects the actuator that executes the instruction output from the vehicle motion control portion 8 or the vehicle motion control portion 13, and outputs the instruction to a corresponding control unit. The vehicle motion control system 1 includes an engine 100, a motor generator 101, an electric control brake 102, an electric parking brake 103, a VDC unit 104, and an electric power steering apparatus 105) as the actuators. The electric control brake 102 controls a frictional brake force on each of wheels by generating a hydraulic pressure in a brake master cylinder with use of an electric motor. The VDC unit 104 individually controls the frictional brake force on each of the wheels with use of an electric pump. The control unit is an engine control unit 111, a motor control unit 112, an electric control brake control unit 113, an electric parking brake control unit 114, a VDC control unit 115, and an electric power steering control unit 116. Each of the control units controls the corresponding actuator according to the instruction output from the vehicle motion control portion 8.

The selector 7*d* selects the engine 100 as the actuator that executes the acceleration instruction. When the abnormality detection portion 7*c* detects an abnormality in the engine 100, the selector 7*d* selects the motor generator 101 instead of the engine 100. The selector 7*d* selects the electric control brake 102 as the actuator that executes the deceleration instruction. When the abnormality detection portion 7*c* detects an abnormality in the electric control brake 102, the selector 7*d* selects the electric parking brake 103 or the VDC unit 104 instead of the electric control brake 102. The selector 7*d* selects the electric power steering apparatus 105 as the actuator that executes the steering instruction. When the abnormality detection portion 7*c* detects an abnormality in the electric power steering apparatus 105, the selector 7*d* selects the VDC unit 104 instead of the electric power steering apparatus 105.

FIG. 2 illustrates a configuration of the vehicle motion control portion 8 according to the first embodiment.

The vehicle motion control portion 8 includes a trajectory buffer portion (a target position accumulation portion) 15, a vehicle position estimation portion 16, a curvature calculation portion 17, a closest point calculation portion 18, a posture angle calculation portion 19, a relative position calculation portion 20, and an actuator instruction portion 21.

Figure 3:
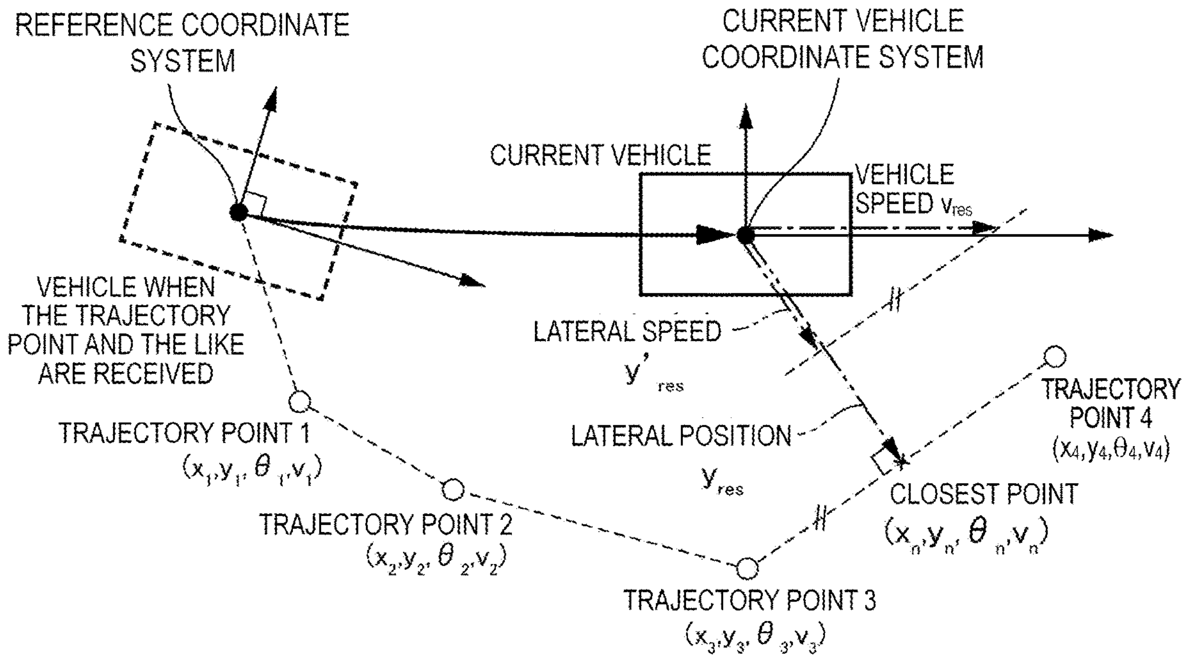
FIG. 3 is a diaphragm in which each trajectory point and a position of a target vehicle are plotted on a reference coordinate system.

The trajectory buffer portion 15 inputs and accumulates the trajectory point and the like output from the trajectory generation portion 6*d* at predetermined time intervals (target position accumulation). The trajectory point is stored as a point on two-dimensional coordinates constructed based on a vehicle coordinate system when the trajectory point and the like are received as a reference coordinate system, as illustrated in FIG. 3. In the reference coordinate system, an origin is placed at the position of the target vehicle when the trajectory point and the like are received, and an x axis and a y axis are set to the longitudinal axis direction and a lateral direction of the target vehicle, respectively. The yaw angle is stored after being replaced with an angle formed between the longitudinal axis direction of the target vehicle and the x-axis direction of the reference coordinate system. Then, the target trajectory may be changed at the time of the emergency avoidance or due to the change in the traffic lane. In this case, the trajectory buffer portion 15 receives the trajectory point and the like successively in order from the closest trajectory point and the like to the position of the target vehicle among the trajectory points and the like after the change to the trajectory point and the like located at the preview distance. The trajectory point and the like before the change that are accumulated in the trajectory buffer portion 15 are discarded. At this time, the trajectory buffer portion 15 shortens the interval at which the trajectory point and the like are received or extends the distance between the trajectory points according to the vehicle speed or the like of the target vehicle so as to input the next trajectory point before the target vehicle reaches the trajectory point closest to the target vehicle among the trajectory points after the change. This shortening of the reception interval or extension of the distance between the points is carried out since the target trajectory is changed until the trajectory point and the like at the preview distance are received.

The vehicle position estimation portion 16 estimates the position of the target vehicle from so-called dead reckoning based on an integral value of a wheel speed, a yaw rate, a longitudinal acceleration, a lateral acceleration (a horizontal acceleration), and the like acquired from an internal sensor of the target vehicle (vehicle position estimation).

The curvature calculation portion 17 calculates a curvature and a change in the curvature of the target trajectory from each of the trajectory points accumulated in the trajectory buffer portion 15 (curvature calculation). For example, the curvature calculation portion 17 may acquire a curvature and a change in the curvature of a curve smoothly connecting each of the trajectory points, and set them as the curvature and the change in the curvature of the target trajectory.

The closest point calculation portion 18 calculates the closest point (a closest target position), which is the point closest to the target vehicle on a line connecting each of the trajectory points accumulated in the trajectory buffer portion 15. As illustrated in FIG. 3, a positional relationship between each of the trajectory points (a trajectory point 1 ($x_1$, $y_1$, $\theta_1$, $v_1$), a trajectory point 2 ($x_2$, $y_2$, $\theta_2$, $v_2$), a trajectory point 3 ($x_3$, $y_3$, $\theta_3$, $v_3$), and a trajectory point 4 ($x_4$, $y_4$, $\theta_4$, $v_4$)) accumulated in the trajectory buffer portion 15 and the target vehicle can be confirmed by projecting the current vehicle coordinate system on the reference coordinate system. Assume that x, y, θ, and v represent the x coordinate, the y coordinate, the yaw angle, and the vehicle speed. In FIG. 3, for example, the yaw angle $\theta_2$ of the trajectory point 2 is an angle that matches the tangential direction of the target trajectory, and therefore is expressed as, for example, $\theta_2 \approx$ {(an angle of a line segment connecting the trajectory points 1 and 2 therebetween×a distance between the trajectory points 2 and 3)+(an angle of a line segment connecting the trajectory points 2 and 3 therebetween×a distance between the trajectory points 1 and 2)}/(the distance between the trajectory points 1 and 2+the distance between the trajectory points 2 and 3). Because the target trajectory extends along the curve smoothly connecting each of the trajectory points 1, 2, 3, and 4, the yaw angle that allows the longitudinal axis direction of the target vehicle to match the tangential direction of the target trajectory can be acquired by using the above-described equation. In the case of FIG. 3, the closest point ($x_n$, $y_n$, $\theta_n$, $v_n$) is set on a line segment connecting the trajectory points 3 and 4 therebetween. The yaw angle $\theta_n$ at the closest point is determined to be a middle point between the yaw angle $\theta_3$ at the trajectory point 3 and the yaw angle $\theta_4$ at the trajectory point 4. Further, the vehicle speed $v_n$ at the closest point is determined to be an average value of the vehicle speed $v_3$ at the trajectory point 3 and the vehicle speed $v_4$ at the trajectory point 4.

The posture angle calculation portion 19 calculates a posture angle of the target vehicle required to allow a traveling direction of the target vehicle at the closest point calculated by the closest point calculation portion 18 to match the yaw angle at the closest point, i.e., the tangential direction of the target trajectory based on the curvature and the change in the curvature of the target trajectory that are calculated by the curvature calculation portion 17 while also taking the vehicle speed and the like into consideration (posture angle calculation). The posture angle is an angle formed between the traveling direction and the longitudinal axis direction of the target vehicle. The posture angle calculation portion 19 calculates such a posture angle that a front-side direction of the target vehicle faces toward a steering outer side with respect to the traveling direction of the target vehicle in such a manner that a predetermined single point on the target vehicle (the position of the target vehicle) passes through on the target trajectory when running a curve.

The relative position calculation portion 20 calculates a relative position of the closest point calculated by the closest point calculation portion 18 relative to the position of the target vehicle estimated by the vehicle position estimation portion 16 (relative position calculation). In the case of FIG. 3, a distance $y_{res}$ between the position of the target vehicle and the closest point corresponds to a lateral position deviation, and a component of the vehicle speed $v_{res}$ in a direction of the lateral position deviation corresponds to a lateral speed $y'_{res}$.

The actuator instruction portion 21 corrects the yaw angle at the closest point based on the posture angle calculated by the posture angle calculation portion 19. The actuator instruction portion 21 generates a steering instruction and an acceleration or deceleration instruction to allow the vehicle to pass through the closest point with the vehicle speed vehicle and the yaw angle after the correction that aim at the target vehicle based on the relative position of the closest point calculated by the closest position calculation portion 20, and outputs them to the selector 7*d* (actuator instruction output). The steering instruction is a yaw rate instruction, a lateral position instruction, and a yaw angle instruction.

FIG. 4 is a control block diagram of the actuator instruction portion 21 according to the first embodiment.

A multiplier 22 outputs a lateral acceleration instruction by multiplying the yaw rate instruction by the vehicle speed. A subtractor 23 outputs a lateral position deviation instruction by subtracting the lateral position from the lateral position instruction. A gain block 24 outputs a lateral speed instruction by multiplying the lateral position deviation instruction by a positional gain $K_p$. A subtractor 25 outputs a lateral speed deviation instruction by subtracting the lateral speed from the lateral speed instruction. A gain block 26 outputs a lateral acceleration deviation instruction by multiplying the lateral speed deviation instruction by a speed gain $K_d$. An adder 27 adds the lateral acceleration deviation instruction to the lateral acceleration instruction, and outputs it. A plant model (a vehicle model) 29 inputs the lateral acceleration instruction for canceling out a disturbance, and outputs the lateral acceleration and the yaw rate.

A second-order integral block 33 calculates the lateral position by calculating a second-order integral of the lateral acceleration. A first-order integral block 34 calculates the yaw angle by calculating a first-order integral of the yaw rate. A subtractor 35 calculates a yaw angle deviation by subtracting the yaw angle instruction from the yaw angle. A first-order differential block 36 calculates a yaw rate deviation by calculating a first-order differential of the yaw angle deviation. A multiplier 37 calculates a lateral speed by multiplying the yaw rate deviation by the vehicle speed.

Next, functions and advantageous effects of the first embodiment will be described.

In recent years, the functions of the autonomous driving have been expanding, and the system has been required to be designed based on recognition of an external world, planning of a trajectory, generation of a route, and a control and logical configuration due to a collection of the individual driving assist functions such as the ACC and the LKS. The vehicle motion driving control system 1 according to the first embodiment is connected to a superior controller (the ADCU 6) that calculates the trajectory point based on the target trajectory for each of the driving assist functions, an external world recognition sensor (the locater 3 and the camera unit 4), and each of the actuators of the vehicle, and includes the VMCU 7 that holds the trajectory point fed from the ADCU 6 and outputs the instruction for causing the target vehicle to follow the target trajectory to each of the actuators. The VMCU 7 controls the actuators according to the instruction based on the trajectory point, and therefore can realize each of the driving assist functions regarding the autonomous driving with a simple system configuration. Further, the VMCU 7 can realize the vehicle motion required by each of the driving assist functions with a same control characteristic. Furthermore, the VMCU 7 can realize each of the driving assist functions by itself based on the information acquired from the external world recognition sensor when a failure has occurred in the ADCU 6, because being connected to the external world recognition sensor.

Then, the conventional vehicle motion control apparatus based on the preview model determines the steering according to the position that the target vehicle will reach after several seconds and the target position. In other words, the target position is located far away from the target vehicle, which likely causes the running trajectory to become the shortcut trajectory with respect to the target trajectory when the vehicle is steered, thereby leading to the reduction in followability to the target trajectory. Especially when the vehicle runs on a sharp curve (for example, a curve approximately 5 to 10 m in radius) at a low speed (for example, a vehicle speed range from a creep speed to approximately 20 km/h), driving in this scene leads to a noticeable shortcut trajectory, thereby increasing a possibility of the departure from the traffic lane. Now, the shortcut trajectory when the vehicle runs the sharp curve at the low speed can be avoided by using a method that predetermines an operation pattern from a parking start position to a parking position in advance like an autonomous parking system. However, the autonomous parking system is constructed assuming that the vehicle runs in a low vehicle speed range, and thus the use of this method necessarily results in an increase in a deviation between the target position and the actual position according to an increase in the vehicle speed, thereby ending up forcing a consideration correction. In other words, the method according to the autonomous parking system is not suitable to vehicle motion control in intermediate and high vehicle speed ranges like a city area and an expressway, and lacks versatility. Then, one conceivable solution is to normally perform the vehicle motion control based on the preview model and employ the method according to the autonomous parking system only when the vehicle runs the sharp curve at the low speed, but, in this case, the control characteristic becomes discontinuous. With the discontinuous control characteristic, these control methods may fail to match each other when these control methods are switched (a transition period), and this mismatch may lead to a reduction in the followability to the target trajectory.

On the other hand, the VMCU 7 according to the first embodiment includes the trajectory buffer portion 15 that accumulates the trajectory point and the like output from the ADCU 6, and the actuator instruction portion 21 that outputs, to each of the actuators, the instruction for causing the target vehicle to follow the closest point, which is the point closest to the position of the target vehicle on the line connecting each of the trajectory points accumulated in the trajectory buffer portion 15. The closest point is the previous target position set on the line segment connecting two trajectory points accumulated prior to the current (latest) trajectory point accumulated most recently. In other words, the VMCU 7 according to the first embodiment causes the target vehicle to follow the closer trajectory point to the target vehicle than the preview point, thereby making the generation of the shortcut trajectory unlikely when the vehicle runs a curve compared to when the preview model is employed. As a result, the VMCU 7 can prevent or cut down the reduction in the followability to the target trajectory in the vehicle motion control. Further, the closest point is the closest point on the target trajectory to the target vehicle, which makes the generation of the shortcut trajectory unlikely even when the vehicle runs the sharp curve at the low speed. In addition, the control characteristic does not have to be switched according to the vehicle speed and the shape of the road. Therefore, the VMCU 7 according to the first embodiment can prevent or cut down the reduction in the followability to the target trajectory regardless of the vehicle speed and the shape of the target trajectory.

The conventional vehicle motion control apparatus has no choice but to place the target position that the target vehicle is caused to follow at a position somewhat far away from the target vehicle. This is because the vicinity of the target vehicle like the closest point falls out of the imaging range of the stereo camera (a blind area), so that the target position cannot be recognized by the stereo camera. On the other hand, the VMCU 7 according to the first embodiment includes the trajectory buffer portion 15 that accumulates the trajectory point input from the ADCU 6, and therefore can recognize the closest point that is located at the blind angle of the camera unit 4, thereby realizing the control of causing the target vehicle to follow the closest point.

The VMCU 7 includes the vehicle position estimation portion 16 that estimates the position of the target vehicle by the dead reckoning, and the relative position calculation portion 20 that calculates the relative position of the closest point relative to the estimated position of the target vehicle, and the actuator instruction portion 21 outputs the instruction for causing the target vehicle to follow the closest point based on the calculated relative position. Where each of the given trajectory points is located on the coordinates of the target vehicle should be estimated to cause the target vehicle to follow the closest point. Therefore, the followability of the target vehicle to the target trajectory can be improved by estimating a change in the position of the target vehicle and constantly recognizing the relative relationship between the given trajectory point and the target vehicle.

The VMCU 7 includes the curvature calculation portion 17 that calculates the curvature of the target trajectory from each of the accumulated trajectory points, and the posture angle calculation portion 19 that calculates the posture angle required to allow the traveling direction of the target vehicle at the closest point and the tangential direction of the target trajectory to match each other based on the calculated curvature and curvature change. Then, the actuator instruction portion 21 outputs the instruction for tilting the front-side direction of the target vehicle at the closest point toward the steering outer side with respect to the tangential direction of the target trajectory at the closest point based on the calculated posture angle. When the vehicle runs the sharp curve at the low speed, the front-side direction of the target vehicle should be tilted largely toward the steering outer side with respect to the tangential direction of the target trajectory to cause the target vehicle to follow the target trajectory. Now, the front-side direction of the target vehicle is turned toward the preview point in the vehicle motion control based on the preview model, hypothetically supposing that the traveling direction of the target vehicle and the longitudinal axis direction of the target vehicle approximately match each other. This means that, when the vehicle runs the sharp curve at the low speed, the front-side direction of the target vehicle faces a steering inner side with respect to the tangential direction of the target trajectory at the position of the target vehicle, and the vehicle cannot follow the target trajectory.

Figure 5:
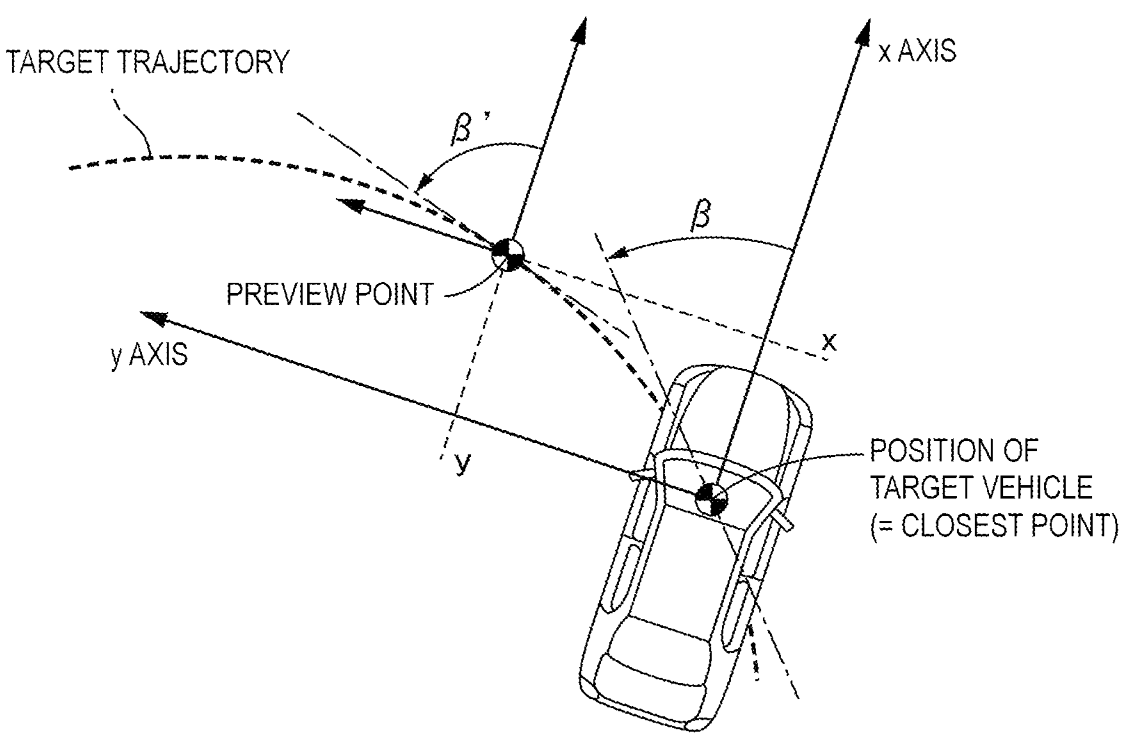
FIG. 5 illustrates a difference between a posture angle β' at a preview point and a posture angle β at a closest point.

Further, suppose that, in FIG. 5, an angle formed between the tangential line of the target trajectory at the preview point and the front-side direction of the target vehicle at the position of the target vehicle (=the closest point) is calculated as a posture angle $\beta'$. In this case, $\beta'$ is acquired as an angle different from the posture angle $\beta$ required at the current position of the target vehicle. Therefore, the vehicle cannot follow the target trajectory even by controlling the yaw angle of the target vehicle so as to achieve $\beta'$ at the position of the target vehicle. On the other hand, the VMCU 7 according to the first embodiment calculates the posture angle $\beta$ required at the current position of the target vehicle, and controls the yaw angle of the target vehicle in such a manner that this angle matches $\beta$. In other words, the VMCU 7 controls the target vehicle in such a manner that the front-side direction of the target vehicle constantly faces the steering outer side with respect to the tangential line of the trajectory drawn by a predetermined point (a center of gravity or the like) on the target vehicle. As a result, the target vehicle can be controlled in such a manner that the predetermined single point on the target vehicle passes through on the target trajectory. Especially, when the vehicle runs the sharp curve having the predetermined curvature (for example, the curve approximately 5 to 10 m in radius) at the predetermined vehicle speed (for example, the vehicle speed range from the creep speed to approximately 20 km/h), the running trajectory of the target vehicle can be prevented from becoming the shortcut trajectory with respect to the target trajectory and thus the followability to the target trajectory can be considerably improved compared when the preview model is employed.

The vehicle motion control portion 13 outputs the instruction (the acceleration instruction, the deceleration instruction, and/or the steering instruction) for causing the target vehicle to follow the trajectory point and the like for the LKS and the AEB that are generated by the LKS/AEB control portion 11 to the selector 7*d* when the VMCU 7 cannot receive the trajectory point and the like, or outputs the instruction for causing the vehicle to follow the trajectory point and the like accumulated in the trajectory buffer portion 10 for the predetermined time to the selector 7*d* when determining that the trajectory point and the like generated by the LKS/AEB control portion 11 cannot allow the vehicle to maintain the safe running. Due to this configuration, at least the driving assist function can be maintained even when the VMCU 7 cannot receive the trajectory point and the like due to occurrence of a failure in the superior controller (the ADCU 6) or the communication.

The vehicle motion control system 1 includes the plurality of actuators as each of the actuator that provides the longitudinal acceleration to the target vehicle (the engine 100, the motor generator 101, the electric control brake 102, and the electric parking brake 103), and the actuator that provides the yaw moment to the target vehicle (the power steering apparatus 105 and the VDC unit 104). Then, when a failure has occurred in any of the actuators, the actuator instruction portion 21 outputs the instruction to an actuator without the failure occurring therein. For example, when a failure has occurred in the engine 100, the acceleration instruction is output to the motor generator 101. Further, when a failure has occurred in the electric control brake 102, the deceleration instruction is output to the electric parking brake 103. When a failure has occurred in the electric power steering apparatus 105, the steering instruction is output to the VDC unit 104. Redundantly providing the actuators having similar functions allow the driving assist function to continue by actuating the normal actuator even when a failure has occurred in the actuator in operation.

Figure 6:
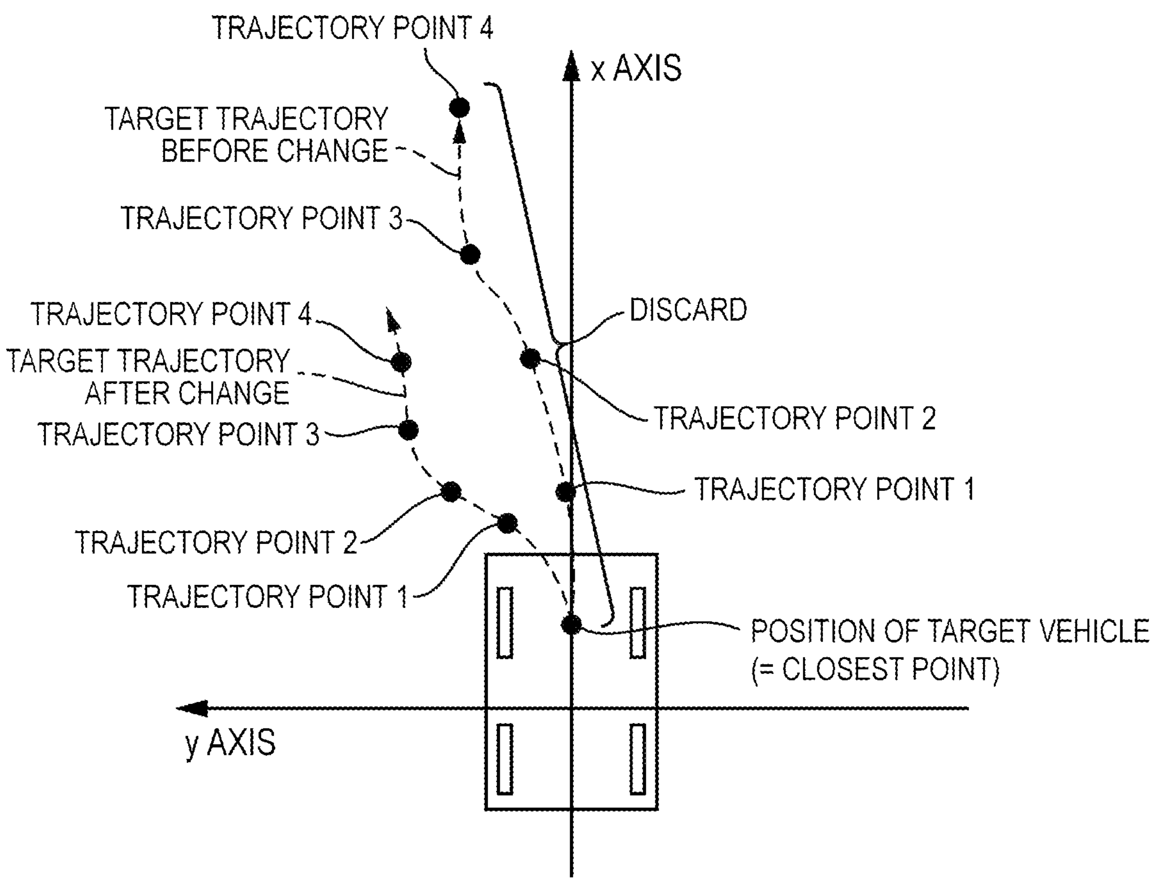
FIG. 6 illustrates a method for inputting the trajectory point when a target trajectory is changed.

The trajectory buffer portion 15 inputs the next trajectory point before the target vehicle reaches the trajectory point closest to the target vehicle among the trajectory points after the change, when the target trajectory is changed. FIG. 6 illustrates a method for inputting the trajectory point when the target trajectory is changed. When the target trajectory is changed from the target trajectory before the change to the target trajectory after the change, the trajectory buffer portion 15 discards each of the accumulated trajectory points 1 to 4 before the change, and inputs the trajectory points 2 to N successively in order from the trajectory point 1 closest to the current position of the target vehicle in the target trajectory after the change. The trajectory point N is a trajectory point after the preview time. At this time, the trajectory buffer portion 15 inputs the trajectory points 2 to N at such a reception interval that the target trajectory extends earlier than the arrival of the target vehicle at the trajectory point 1 in the target trajectory after the change. Now, hypothetically supposing that the trajectory buffer portion 15 continues the method that inputs the target trajectory after the preview time when the target trajectory is changed, the vehicle would be unable to follow the changed target trajectory in this case because the target trajectory from the position of the target vehicle to the trajectory point after the preview time is unknown. On the other hand, the VMCU 7 can allow the vehicle to follow the closest point by receiving the trajectory point in order from the trajectory point close to the target vehicle and at a faster pace than the arrival of the target vehicle at the trajectory point when the target trajectory is changed. Therefore, the followability to the target trajectory after the change can be improved even when the target trajectory is changed according to the emergency avoidance or the change in the traffic lane.

Second Embodiment

A second embodiment is different from the first embodiment in terms of selecting the target position that the target vehicle is caused to follow according to a running state of the target vehicle.

The closest point calculation portion 18 outputs a trajectory point located on a front side in the traveling direction with respect to the closest point among the individual trajectory points accumulated in the trajectory buffer portion 15 as the target trajectory point as long as the target vehicle is running at a high speed. At this time, the target trajectory point may be placed at a trajectory point farther away from the target vehicle as the vehicle speed of the target vehicle increases. The relative position calculation portion 20 calculates the relative position of the target trajectory point relative to the position of the target vehicle. The actuator instruction portion 21 generates the steering instruction and/or the acceleration or deceleration instruction based on the relative position of the target trajectory point, and outputs them to the selector 7*d*.

Because the departure from the traffic lane due to the shortcut occurs when the vehicle runs the sharp curve at the low speed, the running trajectory of the target vehicle can be prevented from becoming the shortcut trajectory by placing the target position in the following control at the closest point while the vehicle is running at a low speed. On the other hand, the departure from the traffic lane due to the shortcut does not occur on an expressway because there is no sharp curve on an expressway, where the vehicle is assumed to run at a high speed. Therefore, the gain in the following control reduces and thus a change in a behavior of the vehicle according to the following control can be eliminated or reduced, by placing the target trajectory point in the following control at the point on the front side in the traveling direction with respect to the closest point while the vehicle is running at a high speed. In other words, the second embodiment can improve ride comfort when the vehicle runs at a high speed while preventing or cutting down the reduction in the followability to the target trajectory when the vehicle runs at a low speed, by selecting the target position according to the running state (the vehicle speed).

In the following description, other configurations recognizable from the above-described embodiments will be described.

A vehicle motion control apparatus, in one configuration thereof, includes a target position accumulation portion configured to receive an input of a target position on a target trajectory of a vehicle on which the vehicle motion control apparatus is mounted and accumulate the target position, and an actuator instruction portion configured to output an instruction for causing the vehicle to follow previous target positions accumulated by the target position accumulation portion to an actuator of the vehicle.

According to a further preferable configuration, in the above-described configuration, the actuator instruction portion outputs an instruction for causing the vehicle to follow a closest target position closest to the vehicle among the previous target positions as the instruction.

According to another preferable configuration, any of the above-described configurations further includes a vehicle position estimation portion configured to estimate a position of the vehicle, and a relative position calculation portion configured to calculate a relative position of the closest target position relative to the position of the vehicle estimated by the vehicle position estimation portion. The actuator instruction portion outputs the instruction for causing the vehicle to follow the closest target position based on the relative position calculated by the relative position calculation portion as the instruction.

According to further another preferable configuration, any of the above-described configurations further includes a curvature calculation portion configured to calculate a curvature of the target trajectory from each of the target positions accumulated by the target position accumulation portion, and a posture angle calculation portion configured to calculate a posture angle required to allow a traveling direction of the vehicle at the previous target position and a tangential direction of the target trajectory to match each other based on the curvature calculated by the curvature calculation portion, assuming that the posture angle is an angle formed between the traveling direction of the vehicle and a longitudinal axis direction of the vehicle. The actuator instruction portion outputs an instruction for tilting a front-side direction of the vehicle outward in a steering direction with respect to the tangential direction of the target trajectory based on the posture angle calculated by the posture angle calculation portion as the instruction.

According to further another preferable configuration, in any of the above-described configurations, the actuator instruction portion selects the target position according to a running state of the vehicle among the previous target positions and outputs an instruction for causing the vehicle to follow this selected target position as the instruction.

According to further another preferable configuration, any of the above-described configurations further includes a fail-safe actuator instruction portion. When the target position accumulation portion cannot accumulate the target position, the fail-safe actuator instruction portion outputs an instruction for causing the vehicle to follow a trajectory based on external world recognition information acquired by an external world recognition portion mounted on the vehicle, or outputs an instruction for causing the vehicle to follow a trajectory based on the previous target positions accumulated by the target position accumulation portion.

According to further another preferable configuration, any of the above-described configurations further includes a vehicle position estimation portion configured to estimate a position of the vehicle. When the target trajectory is changed, the target position accumulation portion receives an input of a next target position before the vehicle reaches the target position on the target trajectory after the change.

According to further another preferable configuration, in any of the above-described configurations, the actuator includes a plurality of actuators. When a failure has occurred in any of the plurality of actuators, the actuator instruction portion outputs the instruction to an actuator without the failure occurring therein.

Further, from another aspect, a vehicle motion control apparatus, in one configuration, is a vehicle motion control apparatus that causes a vehicle on which the vehicle motion control apparatus is mounted to run along a target trajectory. The vehicle motion control apparatus controls the vehicle in such a manner that a front-side direction of the vehicle constantly faces outward in a steering direction with respect to a tangential line of a trajectory drawn by a predetermined point on the vehicle when the vehicle runs a curve.

Preferably, in the above-described configuration, the vehicle motion control apparatus controls the vehicle in such a manner that the front-side direction of the vehicle constantly faces outward in the steering direction with respect to the tangential line when a curvature of the curve is larger than a predetermined curvature.

According to another preferable configuration, in any of the above-described configurations, the vehicle motion control apparatus controls the vehicle in such a manner that the front-side direction of the vehicle constantly faces outward in the steering direction with respect to the tangential line when a vehicle speed of the vehicle is lower than a predetermined vehicle speed.

Further, from another aspect, a vehicle motion control method, in one configuration, includes receiving an input of a target position on a target trajectory of a vehicle that should be controlled and accumulating the target position as target position accumulation, and outputting an instruction for causing the vehicle to follow previous target positions accumulated by the target position accumulation to an actuator of the vehicle as actuator instruction output.

Preferably, in the above-described configuration, the actuator instruction output includes outputting an instruction for causing the vehicle to follow a closest target position closest to the vehicle among the previous target positions as the instruction.

According to another preferable configuration, any of the above-described configurations further includes estimating a position of the vehicle as vehicle position estimation, and calculating a relative position of the closest target position relative to the position of the vehicle estimated by the vehicle position estimation as relative position calculation. The actuator instruction output includes outputting the instruction for causing the vehicle to follow the closest target position based on the relative position calculated by the relative position calculation as the instruction.

According to further another preferable configuration, any of the above-described configurations further includes calculating a curvature of the target trajectory from each of the target positions accumulated by the target position accumulation as curvature calculation, and calculating a posture angle required to allow a traveling direction of the vehicle at the previous target position and a tangential direction of the target trajectory to match each other based on the curvature calculated by the curvature calculation, assuming that the posture angle is an angle formed between the traveling direction of the vehicle and a longitudinal axis direction of the vehicle, as posture angle calculation. The actuator instruction output includes outputting an instruction for tilting a front-side direction of the vehicle outward in a steering direction with respect to the tangential direction of the target trajectory based on the posture angle calculated by the posture angle calculation as the instruction.

According to further another preferable configuration, in any of the above-described configurations, the actuator instruction output includes selecting the target position according to a running state of the vehicle among the previous target positions and outputting an instruction for causing the vehicle to follow this selected target position as the instruction.

According to further another preferable configuration, any of the above-described configurations further includes outputting a second instruction to the actuator for fail-safe as fail-safe actuator instruction output. The fail-safe actuator instruction output includes, when the target position cannot be accumulated by the target position accumulation, outputting an instruction for causing the vehicle to follow a trajectory based on external world recognition information acquired by an external world recognition portion mounted on the vehicle as the second instruction, or outputting an instruction for causing the vehicle to follow a trajectory based on the target position accumulated by the target position accumulation as the second instruction.

According to further another preferable configuration, any of the above-described configurations further includes estimating a position of the vehicle as vehicle position estimation. The target position accumulation includes, when the target trajectory is changed, receiving an input of a next target position before the vehicle reaches the target position on the target trajectory after the change.

Further, from another aspect, a vehicle motion control system, in one configuration, includes an autonomous driving control unit including a target trajectory calculation portion configured to calculate a target trajectory of a vehicle on which the vehicle motion system is mounted, a vehicle motion control unit including a target position accumulation portion configured to receive an input of a target position on the target trajectory calculated by the target trajectory calculation portion and accumulate the target position and an actuator instruction portion configured to output an instruction for causing the vehicle to follow previous target positions accumulated by the target position accumulation portion, and an actuator configured to control the vehicle according to the instruction output from the actuator instruction portion.

Preferably, in the above-described configuration, the actuator instruction portion outputs an instruction for causing the vehicle to follow a target position closest to the vehicle among the previous target positions as the instruction.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-25564 filed on Feb. 15, 2017. The entire disclosure of Japanese Patent Application No. 2017-25564 filed on Feb. 15, 2017 including the specification, the claims, the drawings, and the abstract is incorporated herein by reference in its entirety.

REFERENCE SIGN LIST

1 vehicle motion control system
6 autonomous driving control unit
7 vehicle motion control unit (vehicle motion control apparatus)
13 vehicle motion control portion (fail-safe actuator instruction portion)
15 trajectory buffer portion (target position accumulation portion)
16 vehicle position estimation portion
17 curvature calculation portion
19 posture angle calculation portion
20 relative position calculation portion
21 actuator instruction portion
100 engine (actuator)
101 motor generator (actuator)
102 electric control brake (actuator)
103 electric parking brake (actuator)
104 VDC unit (actuator)
105 electric power steering apparatus (actuator)

The invention claimed is:

1. An apparatus comprising:
a vehicle motion controller that is configured to:
receive an input of a target position output from an autonomous driving control unit which generates a target trajectory of a vehicle which is the target position of the vehicle after a preview time, use a vehicle coordinate system when the target position is received as a reference coordinate system, and accumulate the target position as previous target positions on the reference coordinate system; and
output an instruction to an actuator of the vehicle for causing the vehicle to follow the closest point closest to the position of the vehicle, or to follow a target point located on a front side in the traveling direction, wherein the closest point and the target point are on the target trajectory connecting target positions obtained by coordinate transformation of each of previous target positions accumulated with reference to a latest vehicle coordinate system by projecting the reference coordinate system on the latest vehicle coordinate system and closer than a preview point, wherein
the closest point and the target point are closer to the vehicle than the preview point, and
the vehicle motion controller is further configured to calculate the closest point, which is a closest target position and which is the point closest to the vehicle on a line connecting each of the trajectory points accumulated in the trajectory buffer portion, determine a yaw angle at the closest point to be a middle point between yaw angles at two trajectory points between which the closest point is set, determine a vehicle speed at the closest point to be an average value of vehicle speeds at the two trajectory points, calculate a relative position of the closest point relative to an estimated position of the vehicle, and output the instruction for causing the vehicle to follow the closest point based on the calculated relative position.

2. The apparatus according to claim 1, wherein the vehicle motion controller is also configured to output, as the instruction, an instruction for causing the vehicle to follow a closest target position closest to the vehicle among the target point, which is the point on the line connecting each of the previous target positions.

3. The apparatus according to claim 2, wherein the vehicle motion controller is further configured to:
estimate a position of the vehicle; and
calculate a relative position of the closest target position relative to the estimated position of the vehicle,
output, as the instruction, the instruction for causing the vehicle to follow the closest target position based on the calculated relative position.

4. The apparatus according to claim 1, wherein the vehicle motion controller is further configured to:
calculate a curvature of the target trajectory from the target point, which is the point on the line connecting each of the accumulated target positions; and
calculate a posture angle required to allow a traveling direction of the vehicle at the target point, which is the point on the line connecting each of the previous target positions and a tangential direction of the target trajectory to match each other, based on the calculated curvature, the posture angle being an angle formed between the traveling direction of the vehicle and a longitudinal axis direction of the vehicle, output, as the instruction, an instruction for tilting a front-side direction of the vehicle outward in a steering direction with respect to the tangential direction of the target trajectory, based on the calculated posture angle.

5. The apparatus according to claim 1, wherein the vehicle motion controller is further configured to select the target position according to a running state of the vehicle among the target point, which is the point on the line connecting each of the previous target positions and outputs, as the instruction, an instruction for causing the vehicle to follow the selected target position.

6. The apparatus according to claim 1, wherein the vehicle motion controller is further configured to:

wherein, when the target position cannot be accumulated, output an instruction for causing the vehicle to follow a trajectory based on external world recognition information, or output an instruction for causing the vehicle to follow a trajectory based on the target point, which is the point on the line connecting each of the previously accumulated target positions.

7. The apparatus according to claim 1, wherein the vehicle motion controller is further configured to estimate a position of the vehicle, wherein, when the target trajectory is changed, the vehicle motion controller receives an input of a next target position before the vehicle reaches the target position on the target trajectory after the change.

8. The apparatus according to claim 1, wherein the actuator includes a plurality of actuators, and wherein, when a failure occurs in any of the plurality of actuators, the vehicle motion controller outputs the instruction to an actuator without the failure.

9. The apparatus according to claim 1, wherein the target positions are accumulated using multiple target positions received at different times and the vehicle motion controller calculates a posture angle based on a curvature of the target trajectory at the closest point, and corrects a yaw angle that causes a front-side direction of the vehicle to face outward in a steering direction with respect to the tangential direction of the target trajectory at the closest point.

10. A vehicle motion control method comprising:

receiving an input of a target position output from an autonomous driving control unit which generates a target trajectory of a vehicle which is the target position of the vehicle after a preview time, using a vehicle coordinate system when the target position is received as a reference coordinate system, and accumulating the target position as previous target positions on the reference coordinate system; and outputting an instruction to an actuator of the vehicle for causing the vehicle to follow the closest point closest to the position of the vehicle, or to follow a target point located on a front side in the traveling direction wherein the closest point and the target point are on the target trajectory connecting target positions obtained by coordinate transformation of each of previous target positions accumulated by the receiving the input and the accumulating the target position with reference to a latest vehicle coordinate system by projecting the reference coordinate system on the latest vehicle coordinate system and closer than a preview point, wherein the closest point and the target point are closer to the vehicle than the preview point; and calculating the closest point, which is a closest target position and which is the point closest to the vehicle on a line connecting each of the trajectory points accumulated in the trajectory buffer portion, determine a yaw angle at the closest point to be a middle point between yaw angles at two trajectory points between which the closest point is set, determine a vehicle speed at the closest point to be an average value of vehicle speeds at the two trajectory points, calculate a relative position of the closest point relative to an estimated position of the vehicle, and output the instruction for causing the vehicle to follow the closest point based on the calculated relative position.

11. The vehicle motion control method according to claim 10, wherein the outputting the actuator instruction includes outputting, as the instruction, an instruction for causing the vehicle to follow a closest target position closest to the vehicle among the target point, which is the point on the line connecting each of the previous target positions.

12. The vehicle motion control method according to claim 11, further comprising:

estimating a position of the vehicle; and calculating a relative position of the closest target position relative to the position of the vehicle estimated by the estimating the position, wherein the outputting the instruction includes outputting, as the instruction, the instruction for causing the vehicle to follow the closest target position based on the relative position calculated by the calculating the relative position.

13. The vehicle motion control method according to claim 10, further comprising:

calculating a curvature of the target trajectory from the target point, which is the point on the line connecting each of the target positions accumulated by the receiving the input and the accumulating the target position; and calculating a posture angle required to allow a traveling direction of the vehicle at the target point, which is the point on the line connecting each of previous target positions and a tangential direction of the target trajectory to match each other, based on the curvature, calculated by the calculating the curvature the posture angle being an angle formed between the traveling direction of the vehicle and a longitudinal axis direction of the vehicle, wherein the outputting the instruction includes outputting, as the instruction, an instruction for tilting a front-side direction of the vehicle outward in a steering direction with respect to the tangential direction of the target trajectory, based on the posture angle calculated by the calculating the posture angle.

14. The vehicle motion control method according to claim 10, wherein the outputting the instruction includes selecting the target position according to a running state of the vehicle among the target point, which is the point on the line connecting each of the previous target positions and outputting, as the instruction, an instruction for causing the vehicle to follow the selected target position.

15. The vehicle motion control method according to claim 10, further comprising outputting a second instruction to the actuator for fail-safe, wherein the outputting the second instruction includes, when the target position cannot be accumulated by the receiving the input and the accumulating the target position outputting, as the second instruction, an instruction for causing the vehicle to follow a trajectory based on external world recognition information, or outputting, as the second instruction, an instruction for causing the vehicle to follow a trajectory based on the target point, which is the point on the line connecting each of the target positions accumulated by the receiving the input and the accumulating the target position.

16. The vehicle motion control method according to claim 10, further comprising estimating a position of the vehicle, wherein the receiving the input and the accumulating the target position includes, when the target trajectory is changed, receiving an input of a next target position before the vehicle reaches the target position on the target trajectory after the change.

17. A vehicle motion control system comprising:

an autonomous driving control unit which generates a target trajectory of a vehicle which is the target position of the vehicle after a preview time;

a vehicle motion controller configured to receive an input of a target position output from the autonomous driving control unit, use a vehicle coordinate system when the target position is received as a reference coordinate system, and accumulate the target position as previous target positions on the reference coordinate system, and configured to output an instruction for causing the vehicle to follow the closest point closest to the position of the vehicle, or to follow a target point located on a front side in the traveling direction wherein the closest point and the target point are on the target trajectory connecting target positions obtained by coordinate transformation of each of previous target positions accumulated with reference to a latest vehicle coordinate system by projecting the reference coordinate system on the latest vehicle coordinate system and closer than a preview point; and an actuator configured to control the vehicle according to the instruction that is output wherein the closest point and the target point are closer to the vehicle than the preview point, and the vehicle motion controller is further configured to calculate the closest point, which is a closest target position and which is the point closest to the vehicle on a line connecting each of the trajectory points accumulated in the trajectory buffer portion, determine a yaw angle at the closest point to be a middle point between yaw angles at two trajectory points between which the closest point is set, determine a vehicle speed at the closest point to be an average value of vehicle speeds at the two trajectory points, calculate a relative position of the closest point relative to an estimated position of the vehicle, and output the instruction for causing the vehicle to follow the closest point based on the calculated relative position.

18. The vehicle motion control system according to claim 17, wherein the vehicle motion controller outputs, as the instruction, an instruction for causing the vehicle to follow a target position closest to the vehicle among the target point, which is the point on the line connecting each of the previous target positions.

* * * * *